United States Patent [19]
Noda

[11] 3,972,975
[45] Aug. 3, 1976

[54] METHOD OF MANUFACTURING INLAID HOLLOW PLASTIC BALL
[75] Inventor: Jiseki Noda, Kawasaki, Japan
[73] Assignee: Nodalon Co., Ltd., Tokyo, Japan
[22] Filed: Apr. 18, 1975
[21] Appl. No.: 569,175

Related U.S. Application Data
[63] Continuation-in-part of Ser. No. 162,456, July 14, 1971, abandoned.

[52] U.S. Cl.............................. 264/275; 264/310; 264/DIG. 60
[51] Int. Cl.²...................... B29B 5/04; B29B 5/12; B29D 3/00
[58] Field of Search.... 260/899, 33.8 UA, 33.6 UA, 264/DIG. 60, 275, 310, 311, 245, 247

[56] References Cited
UNITED STATES PATENTS
2,690,981  10/1954  Funk et al................... 260/33.6 UA
2,874,964  2/1959   Edwards............................ 264/275
2,901,446  8/1959   Hawkins..................... 260/33.8 UA
2,974,114  3/1961   Steckler et al.............. 260/33.8 UA OTHER PUBLICATIONS
Sarvetnick, Plastisols and Organosls, Van Nostrand Reinhold, N. Y. (1972) pp. 11, 216 & 217.

Primary Examiner—Willard E. Hoag
Attorney, Agent, or Firm—Wenderoth, Lind & Ponack

[57] ABSTRACT
In a method of manufacturing inlaid hollow plastic balls by gelation of a polyvinyl chloride resin paste in a metal mold wherein a decorative plastic piece is fixed to the inner surface of a mold by means of an adhesive and then the polyvinyl chloride resin paste is poured into the mold to form the body of the ball, and the mold is then clamped, rotated and heated to gelate the polyvinyl chloride resin on the surface of the mold and then removing the ball from the mold. The adhesive is a polyvinyl chloride resin paste mixed with a 10% solution of vinyl acetate resin in trichloroethylene.

3 Claims, 5 Drawing Figures

METHOD OF MANUFACTURING INLAID HOLLOW PLASTIC BALL

CROSS-REFERENCE TO RELATED APPLICATION

This is a continuation-in-part of application Ser. No. 162,456, filed July 14, 1971, now abandoned.

BACKGROUND OF THE INVENTION

The present invention relates to a method of manufacturing a hollow plastic ball including the steps of, introducing polyvinyl chloride resin paste in a metal mold to form the hollow ball, and gelating said resin paste along the inner surface of the metal mold. More particularly, the present invention relates to the improvement in the manufacture of an inlaid hollow plastic ball.

It is well known to manufacture the above-mentioned hollow ball by gelation of a polyvinyl chloride resin paste in a mold while heating and rotating the mold laterally and lengthwise.

One of the known processes of applying a decorative figure or pattern on the surface of a hollow ball is to paint or print the desired figure or pattern on the thus-produced hollow ball. However, these figures or patterns must be individually hand-painted and therefore such method is not suitable to mass production. Moreover, the printed image is easily erased or separated from the surface so that the decoration is only temporary. Further, paint or printing ink is not suitable because when such decorative objects are designed for the amusement of babies, the removable ink or paint may be harmful to the baby.

One of the known processes to overcome some of these disadvantages is to form a half-gelated film on the inner surface of the mold by heating a portion of the polyvinyl chloride resin paste, to paint the desired figure by handwriting on the film, and to gelate the remainder of the polyvinyl chloride resin paste in the mold. Thus, a hollow plastic ball having an inlaid figure or pattern in the surface layer of the ball is obtained. However, this process is complex and hand-writing on the concave inner surface is more difficult, so that the process also cannot be adopted for mass production, although a rather permanent and harmless image can be produced by this method.

SUMMARY OF THE INVENTION

Thus, the object of the present invention is to overcome some of the above-mentioned disadvantages and to provide a method for manufacturing a hollow plastic ball having an inlaid decorative figure or pattern.

According to the present invention, a piece of preformed decorative resin film made of polyvinyl chloride resin is adhered to the inner surface of the metal mold by an adhesive, and a polyvinyl chloride resin paste is gelated in the mold as in a conventional process.

The adhesive should satisfy certain essential requirements. First, it must be transparent without producing any defects when the ball is removed from the mold. Secondly, the adhesive must hold the decorative film all through the gelation process, and thirdly, the adhesive must be capable of being easily separated from the mold after the gelation process.

The adhesive which satisfies the requirements is characterized by a mixture of polyvinyl chloride resin paste and a 10% solution of vinyl acetate in trichloroethylene. The mixing ratio of the resin paste to the vinyl acetate solution is 1:0.2–0.8, preferably 1:0.2–0.6 (by weight). The resin paste has a viscosity of 1100–1300 centipoises, and the vinyl acetate solution has an viscosity of 1800–2000 centipoises. Furthermore, the resin paste may contain conventional well-known plasticizers and stabilizers.

Because the decorative film can be easily printed separately, and because the printed image is covered by a gelated adhesive layer, the inlaid hollow plastic ball can be mass-produced easily and the durability of the decorative figure or pattern is superior. Also, because of the durability of the printed image, the plastic ball is not injurious to health. Further, only one simple step is added to the ordinary hollow ball manufacturing process, which simple step makes it possible to produce the ball at a low cost.

BRIEF DESCRIPTION OF THE DRAWING

In order that the invention may be readily carried into effect, it will be described hereinbelow in greater detail, by way of example, with reference to the accompanying drawings, in which.

DESCRIPTION OF THE PREFERRED EMBODIMENTS

Figure 1:
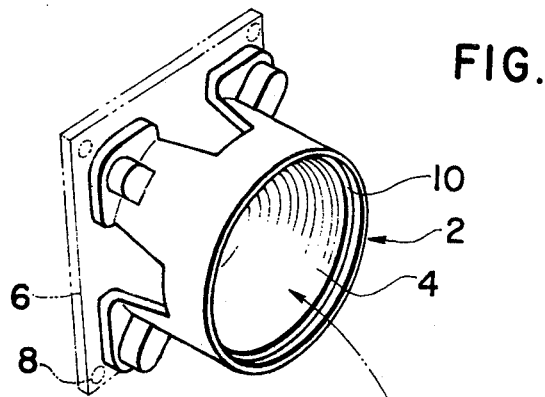
FIG. 1 shows a developed perspective view of a metal mold to manufacture the plastic ball according to the invention.

Referring now to FIG. 1, two halves 1 and 2 of a metal mold to manufacture a plastic ball according to the present invention are shown and each provides semi-spherical inner walls 3 and 4. The mold halves 1 and 2 can be clamped to each other by conventional means. Plates 5 and 6 are secured to the mold halves 1 and 2, respectively and have openings 7 and 8 which may be used to clamp the mold halves by means of bolts through the openings 7 and 8. At the inner peripheral edge of each mold half, a projection 9 and a recess 10 are provided to align the sphere. The metal mold shown in FIG. 1 is a conventional mold ordinarily used to manufacture a plastic ball.

Figure 2:
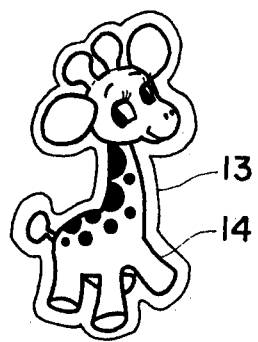
FIG. 2 shows a perspective view of decorative plastic film inlaid in the plastic ball.

FIG. 2 shows a decorative plastic film 13 made of a polyvinyl chloride sheet and having a desired printed figure, letter or pattern 14 on one surface.

One example of preparing a polyvinyl chloride sheet suitable to form decorative plastic film 13 is as follows:

| | |
|---|---|
| polyvinyl chloride | 130 |
| plasticizer | |
|    dioctyl-phthalate (DOP) | 20 |
|    dibutyl-phthalate (DBP) | 50 |
|    dioctyl-adipate (DOA) | 30 |
| stabilizer (tin laurate) | 2 |

The plastic having the above-mentioned composition is formed into a plastic sheet of 0.1 – 0.5 mm. thickness, e.g., a 0.3 mm. film is preferable for balls of about 70 mm. diameter. After the desired figures or patterns are printed, the plastic sheet is cut along the figures to form a decorative film 13 having one or more figures 14 as shown in FIG. 2.

Figure 3:
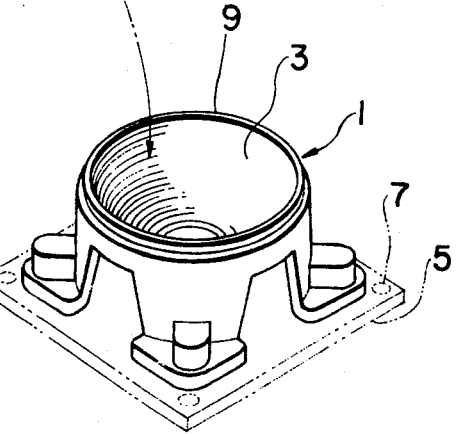
FIGS. 3–5 show longitudinal sectional views of the mold shown in FIG. 1 to illustrate the manufacturing process of the plastic ball.
Figure 3:
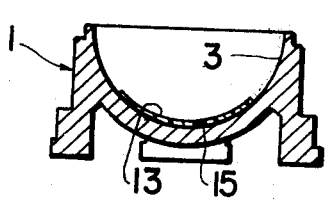
Figure 4:
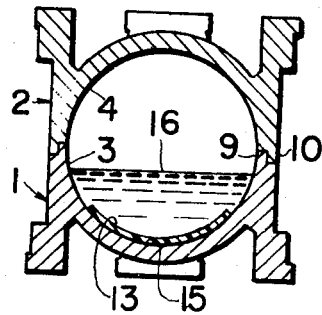

As the first process to manufacture the plastic ball shown in FIG. 3, the decorative plastic film 13 is adhered onto the inner wall 3 of one mold half 1 by the adhesive 15. Then, the desired quantity of polyvinyl chloride resin sol 16 is poured into the mold half 1 as shown in FIG. 4.

One example of the polyvinyl chloride resin sol is as follows:

| | |
|---|---|
| polyvinyl chloride paste resin | 100 |
| plasticizer (DOP) | 20 |
| plasticizer (DBP) | 50 |
| plasticizer (DOA) | 10 |
| stabilizer (calcium stearate) | 1 |
| stabilizer (balium stearate) | 1 |
| coloring agent | 1 |

Figure 5:
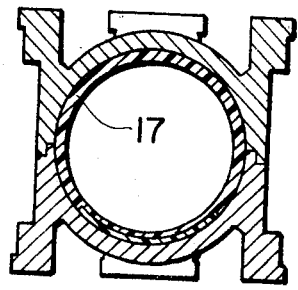

After the polyvinyl chloride resin sol 16 is poured into the mold half 1, the other mold half 2 is secured to form the inner sphere. Then the metal mold is rotated lengthwise and laterally in a heating atmosphere of about 140°C for about 20 minutes. The polyvinyl chloride resin sol is gelated along the inner spherical walls 3 and 4, as shown in FIG. 5, and the decorative plastic film 13 formed on the inner spherical wall of the mold half 1 is integrally inlaid onto the surface layer of the gelated polyvinyl chloride 17. After cooling the metal mold 1 and 2, the mold halves are disassembled and hollow plastic ball 17 can be removed. Thus, a polyvinyl chloride ball having an inlaid decorative film 13 can be manufactured.

As described, a hollow plastic ball having an inlaid decorative film in the surface layer of the ball can be manufactured.

As to the adhesive 15 to adhere the decorative film 13 on the inner wall 3 of the mold half 1, there are essential requirements to be satisfied for manufacturing a satisfactory plastic ball.

The adhesive should be transparent without forming any opaque portion to cover the printed figure or pattern on the decorative film or to impair the attractiveness of the figure.

The adhesive should firmly hold the decorative film while the plastic sol is formed into a hollow plastic ball. After the polyvinyl chloride resin sol is poured into the mold half and the mold halves are tightened together, the metal mold is rotated laterally and lengthwise while it is heated for 20 minutes at 140°C until the resin sol is gelated to form the hollow plastic ball. All the while the adhesive should hold the decorative film firmly to prevent any displacement, deformation or creases.

The adhesive should be easily separated from the inner wall of the mold after the hollow plastic ball is formed. After the polyvinyl chloride resin sol which has been poured into the mold half and gelated along the inner spherical surface of the metal mold and the decorative film is inlaid on the surface layer of the gel to form the plastic ball, the metal mold is cooled and the thus-formed plastic ball is removed from the mold. At this time, if the decorative film should be attached to the mold surface, the process of removing the plastic ball would be considerably disturbed, and the ball would undoubtedly be torn when attempting to remove it from the mold. Thus, when the mold is cooled to remove the plastic ball, the adhesive force should be weakened to such an effect as to facilitate the removing process.

According to the present invention, an adhesive which satisfies all the above-mentioned requirements is obtained by the use of a transparent adhesive composed of polyvinyl chloride resin paste and a 10% solution of vinyl acetate in trichloroethylene.

The characteristics of the adhesive are affected greatly by the properties and the quantity of the vinyl acetate solution added to polyvinyl chloride resin. Preferable examples of composition of the adhesive, according to the invention, and the effects of the quantity of the vinyl acetate solution will be shown:

EXAMPLE 1

An adhesive was prepared by mixing the following components A and B in a mixing ratio as shown in the following Table 1.

| Component A | |
|---|---|
| Polyvinyl chloride resin | 100 (parts by wt) |
| Plasticizer (DOP) | 60 |
| Plasticizer (DBP) | 20 |
| Stabilizer (epoxy resin) | 3 |

Component B
10% solution of vinyl acetate in trichloroethylene

This adhesive was used to form a plastic ball by the method shown in FIGS. 3–5. The adhesion test was made with respect to the thus formed plastic ball to obtain a result as shown in Table 1.

Table 1

| Sample No. | Mixing ratio of Components A/B (by wt) | Binding of the adhesive to the mold | Properties of plastic ball | |
|---|---|---|---|---|
| | | | Separation of the ball from the mold | Appearance of decorative film |
| 1 | 100:0 | not bound | rapidly separated | film freely floats, and is uneven |
| 2 | 100:10 | difficult to be bound | easily separated | " |
| 3 | 100:20 | completely bound | " | beautiful, complete decorative effect |
| 4 | 100:40 | " | " | " |
| 5 | 100:60 | " | " | " |
| 6 | 100:100 | slightly bound | barely separated | " |
| 7 | 60:100 | " | " | film is partially peeled off |
| 8 | 30:100 | " | difficult to be separated | decorative effect is small and tackiness of the adhesive fairly remains |
| 9 | 10:100 | " | very difficult to be separated | film is partially peeled off |
| 10 | 0:100 | not bound | not separated | film is partially peeled off and is |

Table 1-continued

| Sample No. | Mixing ratio of Components A/B (by wt) | Binding of the adhesive to the mold | Properties of plastic ball Separation of the ball from the mold | Appearance of decorative film |
|---|---|---|---|---|
| | | | | cloud |

As seen from Table 1, when the mixing ratio of the components A/B is within the range of the present invention, a hollow plastic ball having an inlaid decorative force can be obtained.

EXAMPLE 2

| Polyvinyl chloride resin paste | 50 (parts by wt) |
|---|---|
| Plasticizer (DOP) | 30 |
| Stabilizer (epoxy resin) | 5 |
| 10% solution of vinyl acetate | 10 |

Also, the adhesive according to Example 2 obtains a superior plastic ball having an inlaid decorative film.

As seen from Examples 1 and 2, the 10% solution of vinyl acetate can be increased to 60 parts to obtain superior effects. However, when the vinyl acetate solution is increased to 100 parts, the plastic ball can only be removed with difficulty, and when the vinyl acetate solution is decreased to 10 parts the decorative film is displaced or creased during the gelation process.

By utilizing one of the adhesives shown in Examples 1 and 2, the plastic ball manufacturing process shown in FIGS. 3–5 can be successfully performed. As the polyvinyl chloride resin sol 16 which had been poured into the mold half 1 is heated and gelated along the inner surface of the mold, the adhesive 15 which holds the decorative film 13 is also gelated. Thus, the image or pattern on the decorative film 13 can be seen through the transparent gelated adhesive 15, and thus the desired decorative effect is obtained.

As the gelated adhesive 15 which covers the image or pattern of the decorative film 13 is integrally and firmly bound with the decorative film 13, the printing ink on the decorative film 13 is positively covered, so that the printed image or pattern will not be untimely faded. Thus, a plastic ball having a long lasting figure can be obtained.

Further, by covering the printed figure or pattern by a gelated plastic film of adhesive 15, no adverse sanitary effects are produced if a child puts the ball in his mouth. This is advantageous compared with conventional balls having an exposed printed or painted figure.

The adhesive according to the present invention is gelated along with the gelation of the main body of the plastic ball. This means that the adhesive produces a sufficient adhesive force to maintain the decorative film in position until the polyvinyl chloride resin sol 16 is gelated along the inner surface of the metal mold 1 and the decorative film 13 is integrally inlaid in the surface layer of the resin sol 16 to prevent displacement or deformation of the decorative film 13. Further, as the resin sol 16 is gelated to form the plastic ball, the adhesive is also gelated and the adhesive property is lost, thus making it possible to easily remove the plastic ball from the mold.

The various portions of ingredients in the specification and Examples refer to parts by weight, unless otherwise specified.

What is claimed is:

1. In a method of manufacturing an inlaid hollow plastic ball in which a piece of a preformed polyvinyl chloride decorative film is fixed on an inner surface of a metal mold by means of a transparent adhesive, and a polyvinyl chloride resin is poured into said metal mold so as to form a body of a hollow plastic ball, and said mold is clamped and rotated laterally and lengthwise while heating to effect gelation of said resin along said inner surface, and then the resulting ball is removed from said mold, the improvement which comprises using as an adhesive a mixture of polyvinyl chloride resin paste and a 10% (wt.) solution of vinyl acetate resin in trichloroethylene, said paste and said solution being in the ratio of 1:0.2 to 0.6 (by weight).

2. The method as claimed in claim 1 wherein said vinyl acetate solution has a viscosity of 1800–2000 centipoises.

3. The method as claimed in claim 1 wherein said resin paste has a viscosity of 1100–1300 centipoises.

* * * * *